(12) United States Patent
Kasai et al.

(10) Patent No.: US 9,733,066 B2
(45) Date of Patent: Aug. 15, 2017

(54) SHAPE MEASURING METHOD AND DEVICE

(71) Applicant: Hitachi, Ltd., Chiyoda-ku, Tokyo (JP)

(72) Inventors: Hiroaki Kasai, Tokyo (JP); Tatsuo Hariyama, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/898,661

(22) PCT Filed: Apr. 28, 2014

(86) PCT No.: PCT/JP2014/061810
§ 371 (c)(1),
(2) Date: Dec. 15, 2015

(87) PCT Pub. No.: WO2015/004974
PCT Pub. Date: Jan. 15, 2015

(65) Prior Publication Data
US 2016/0131473 A1    May 12, 2016

(30) Foreign Application Priority Data
Jul. 9, 2013    (JP) .................. 2013-143152

(51) Int. Cl.
*G01B 11/30*    (2006.01)
*G01B 11/02*    (2006.01)
(Continued)

(52) U.S. Cl.
CPC ............ *G01B 11/026* (2013.01); *G01B 11/12* (2013.01); *G01B 11/24* (2013.01)

(58) Field of Classification Search
CPC ........ G01B 11/24; G01B 11/026; G01B 11/12
(Continued)

(56) References Cited

U.S. PATENT DOCUMENTS

| 2007/0139059 A1 | 6/2007 | Lindner et al. |
| 2011/0037974 A1 | 2/2011 | Gnausch |
| 2015/0241206 A1 | 8/2015 | Kasai et al. |

FOREIGN PATENT DOCUMENTS

| JP | 51-1154 A | 1/1976 |
| JP | 59-17806 U | 2/1984 |

(Continued)

OTHER PUBLICATIONS

International Search Report (PCT/ISA/210) issued in PCT Application No. PCT/JP2014/061810 dated Aug. 5, 2014 with English translation (five pages).

*Primary Examiner* — Tri T Ton
(74) *Attorney, Agent, or Firm* — Crowell & Moring LLP

(57) ABSTRACT

The purpose of the present invention is to provide a shape measuring device and method, wherein the separation of light from one distance sensor increases measurement precision without increasing the size of the device. The present invention provides "a shape measuring device comprising: a distance sensor that radiates a laser toward a measurement target and detects the reflected light so as to calculate the distance to a measurement point; a separation unit that separates the light from the distance sensor into a plurality of light rays; a rotation unit that rotates the distance sensor and the measurement target relative to each other; and a data processing unit that integrates measurement results obtained from the distance sensor for the distances to a plurality of measurement points."

13 Claims, 14 Drawing Sheets

(51) Int. Cl.
*G01B 11/12* (2006.01)
*G01B 11/24* (2006.01)

(58) Field of Classification Search
USPC .................................................. 356/600–640
See application file for complete search history.

(56) References Cited

FOREIGN PATENT DOCUMENTS

| | | | |
|---|---|---|---|
| JP | 2001-82921 A | | 3/2001 |
| JP | 2004-333392 A | | 11/2004 |
| JP | 2004333392 A | * | 11/2004 |
| JP | 2006-514747 A | | 5/2006 |
| JP | 2008-304407 A | | 12/2008 |
| JP | 2010-25878 A | | 2/2010 |
| JP | 2011-506944 A | | 3/2011 |
| JP | 2011-196899 A | | 10/2011 |
| JP | 2014-74633 A | | 4/2014 |

* cited by examiner

SHAPE MEASURING METHOD AND DEVICE

TECHNICAL FIELD

The present invention relates to a shape measuring method and a device.

BACKGROUND ART

As a background art of this technical field, JP-A-2008-304407 (Patent Literature 1) is disclosed. In this publication, disclosed is "a reflective surface of a prism is fixed on the axial line of a laser beam emitted from a laser displacement meter. Thus, even when a measuring object is changed or the shape of the inner peripheral surface to be measured is varied, an operation to adjust arrangement of the laser displacement meter and the prism is unnecessary, thereby allowing measurement of the inner diameter D with a simple operation. The reflective surface of the prism is arranged so as to protrude from a support, even when the diameter of the inner peripheral surface of the measuring object is small, and the entire measurement part cannot be guided into the inner peripheral surface, the reflective surface of the prism is guided, so that the inner diameter of the inner peripheral surface is measured".

Further, JP-A-2011-196899 (Patent Literature 2) is disclosed. In this publication, disclosed is "each of laser displacement sensors is mounted which includes, at the base end side of an arm whose tip side is inserted into a tubular body and at each of three circumferential positions, a light-emitting part for emitting each laser light along the axial direction and toward the inside of the tubular body, and a light-receiving part for receiving each light reflecting from the inside of the tubular body. Each of prisms is circumferentially mounted at the tip side of the arm in the same way as each laser displacement sensor which turns laser light emitted from each light-emitting part at a right angle toward the bore surface of the tubular body laterally placed, and turns a part of the laser light directed laterally and then reflected from the bore surface of the tubular body toward the base end side of the arm. A calculation means is provided which obtains the reflection point of the laser light on the bore surface of the tubular body from a detection value of each laser displacement sensor, and calculates the bore of the tubular body from the three reflection points obtained".

CITATION LIST

Patent Literature

PATENT LITERATURE 1: JP-A-2008-304407
PATENT LITERATURE 2: JP-A-2011-196899

SUMMARY OF INVENTION

Technical Problem

In the inner diameter measuring device of Patent Literature 1, the inner diameter measuring device is rotated to measure the inner diameter. For the purpose, there is a problem that results depend on accuracy of the rotation and it is impossible to distinguish whether a central axis of the measuring object and a central axis of the measuring device are tilted or the measuring object is deformed, and therefore since an adjustment is made so that the central axes are not tilted, an installation is not easy.

In the inner diameter measuring device of Patent Literature 2, distances of three points are measured using three displacement meters, and an inner diameter dimension of the tubular body is calculated based on a sine theorem and a cosine theorem of a triangular shape. There is no problem that results depend on accuracy of the rotation since this inner diameter measuring device has no rotation unit. However, since displacement meters are used as much as the number of measurement locations, a size of the device increases and in addition, displacement meters ought to be further prepared in order to measure multipoint. Therefore, it is not easy to improve inner diameter measurement accuracy due to the multipoint measurement, measure roundness, and measure a shape of a tubular body that is not circular. Further, there is a problem that it is impossible to distinguish whether a central axis of the measuring object and a central axis of the measuring device are tilted or the measuring object is deformed, and therefore an installation is not easy since an adjustment is made so that the central axes are not tilted.

In view of the foregoing, it is an object of the present invention to provide a shape measuring device and a method in which measurement accuracy is improved without increasing a size of the device by separating a light beam from one distance sensor.

Solution to Problem

To accomplish the above-described objects, according to the present invention, provided is "a shape measuring device including a distance sensor that irradiates laser on a measuring object and detects reflected light to calculate a distance up to a measurement point, a separation unit that separates a light beam from the distance sensor in plurality, a rotation unit that relatively rotates the distance sensor and the measuring object, and a data processing unit that integrates measurement results of distances up to a plurality of measurement points obtained from the distance sensor". Further, according to the present invention, provided is "a shape measuring method including separating a laser beam irradiated from a distance sensor into a plurality of light beams, irradiating the separated light beams on a plurality of measurement points of a measuring object, rotating the distance sensor relatively toward the measuring object, detecting reflected light from the plurality of measurement points by the distance sensor to calculate distances up to the plurality of measurement points, and integrating measurement results of the distances up to the plurality of measurement points".

Advantageous Effects of Invention

According to the present embodiment, it is possible to provide a shape measuring device and a method in which measurement accuracy is improved without increasing a size of the device.

DESCRIPTION OF EMBODIMENTS

Hereinafter, embodiments will be described with reference to the accompanying drawings.

First Embodiment

In the present embodiment, an example of a shape measuring device of a tubular body inner surface and an example of a method for processing a tubular body using the shape measuring device of the tubular body inner surface will be described.

Figure 1:
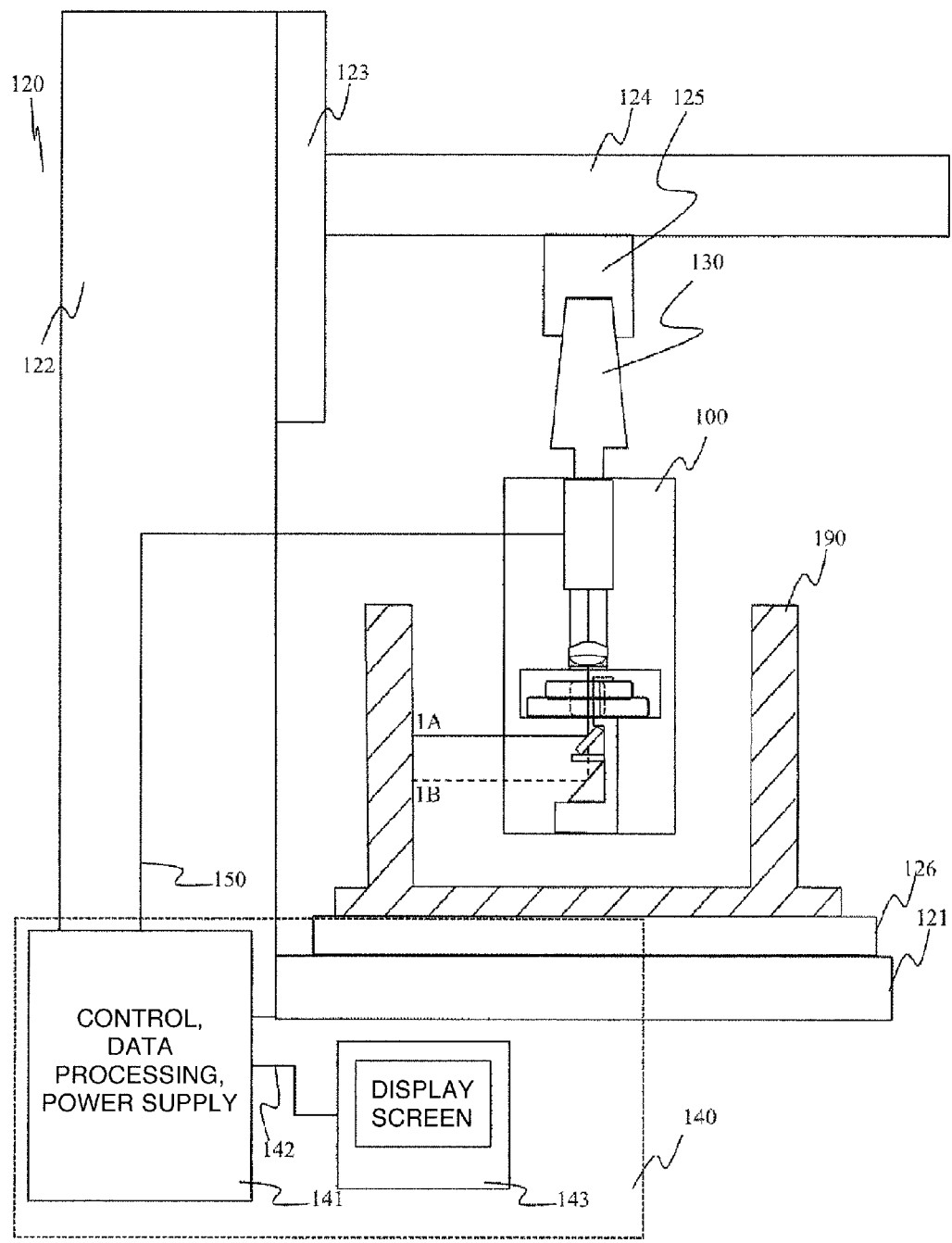
FIG. 1 is a block diagram of a shape measuring device 100 of a tubular body inner surface according to a first embodiment.

FIG. 1 is an example of a block diagram of the shape measuring device 100 of the tubular body inner surface according to the present embodiment.

The shape measuring device 100 of the tubular body inner surface includes an adapter 130 for connecting the measuring device 100 and a processing machine 120, a control unit 140 having a circuit unit 141 that is provided with a control circuit, a data processing circuit, and a power supply circuit, a cable 142, and a display screen 143, and a relay cable 150. Through the relay cable 150, the circuit unit 141 plays a role in transmitting control signals to the measuring device 100, supplying power to the measuring device 100, recording signals transmitted from the measuring device 100, and processing data. On the display screen, measurement conditions and measurement results are displayed.

Figure 2:
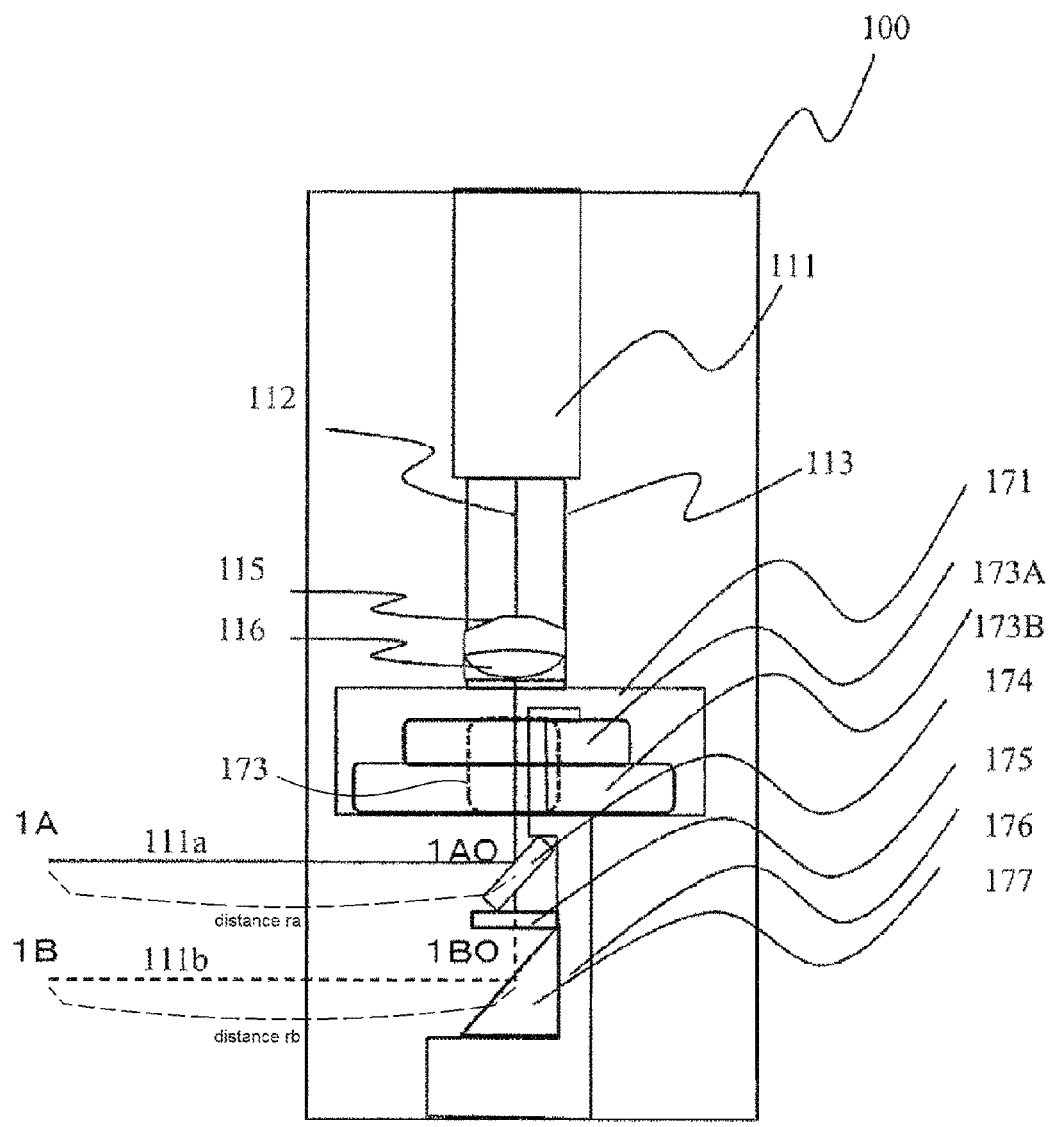
FIG. 2 is a block diagram of the measuring device 100 according to the first embodiment.

FIG. 2 is an example of a block diagram of the measuring device 100.

The measuring device 100 includes a distance sensor 111, an output 112 of the distance sensor, a collimator lens 116, a collimator lens mounter 115, a half mirror 174, a perforated mount 175 for attaching the half mirror 174, a rotation unit 173A of a rotation stage 173, a non-rotation unit 173B of the rotation stage 173, a prism 177, a mounter 176 for fixing them on the rotation unit 173A of the rotation stage 173, and a case 171 for fixing the non-rotation unit 173B on a case 113.

The distance sensor 111 irradiates laser on a measuring object and calculates a distance up to a measurement point by reflected light from the measuring object. A distance measuring system is not limited. Examples include a Phase-Shift method, a TOF (Time-of-Flight) method, an FMCW (Frequency-modulated Continuous-wave) method, and the like.

The half mirror 174 acts as a separation unit that separates the output 112 being light from the distance sensor 111 into a plurality of light beams in a light traveling direction. A point in which the output 112 impinges on the half mirror 174 is set to 1AO, and a point in which light being the output 112 transmitted through the half mirror 174 impinges on the prism is set to 1BO. Further, the output 112 from the distance sensor 111 is separated into reflected light 111a and transmitted light 111b by the half mirror 174. The reflected light 111a is irradiated on a point 1A of a measuring object, returned light thereof is reflected from the half mirror 174 again, and is detected by the distance sensor 111 to calculate a distance ra between the point 1AO and the point 1A. Further, the transmitted light 111b is irradiated on a point 1B of a measuring object, returned light thereof is transmitted through the half mirror 174 again, and is detected by the distance sensor 111 to calculate a distance rb between the point 1BO and the point 1B.

Figure 3:
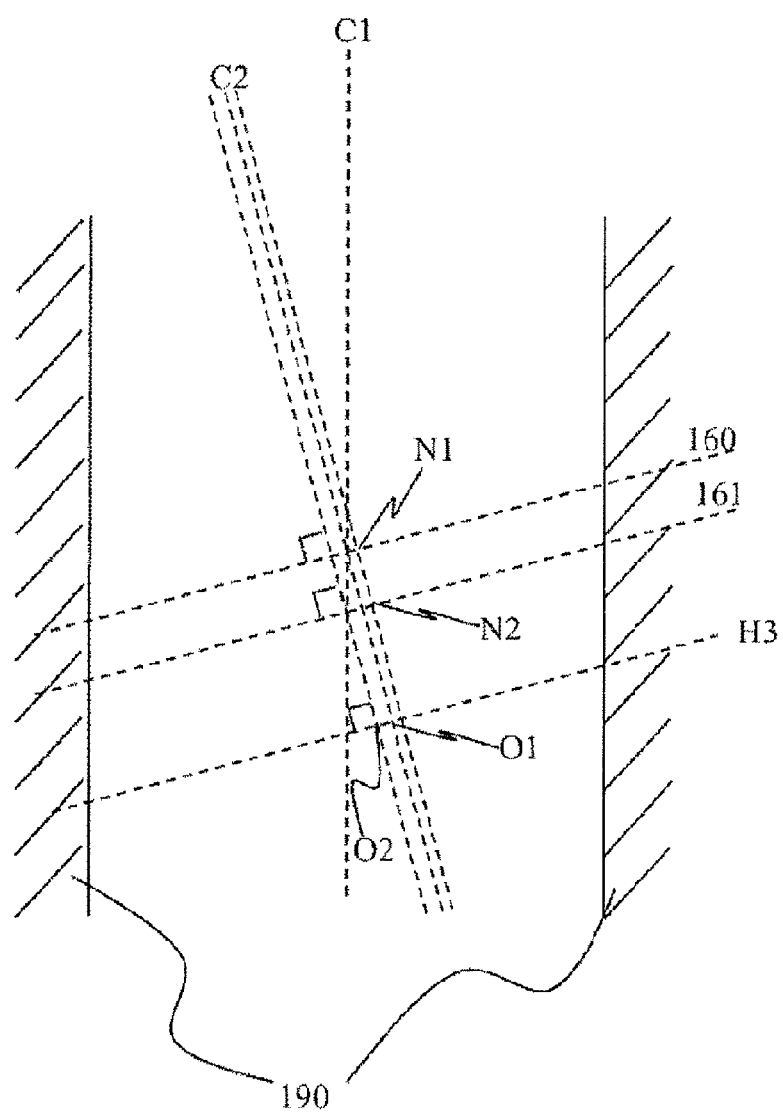
FIG. 3 is a schematic diagram illustrating a relationship between a tubular body 190 and an inner surface shape measuring device in the case in which a central axis is tilted according to the first embodiment.

FIG. 3 is an example of a schematic diagram illustrating a relationship between a tubular body 190 and an inner surface shape measuring device in the case in which a central axis is tilted.

While rotating the rotation unit 173A of the rotation stage 173, the distance ra is calculated, and thereby a cross-sectional shape 160 in which a point A along with the rotation passes through a locus of the tubular body 190 can be measured from the rotation angle and the distance ra.

While rotating the rotation unit 173A of the rotation stage 173, the distance rb is calculated, and thereby a cross-sectional shape 161 in which a point B accompanying the rotation passes through a locus of the tubular body 190 can be measured from the rotation angle and the distance rb.

In the present embodiment, the distance sensor 111 is rotated by the rotation unit 173A of the rotation stage 173; however, the distance sensor 111 may be fixed and a rotation unit that rotates the tubular body 190 may be provided.

Here, data processing performed by the circuit unit 141 being the data processing unit will be described. In the circuit unit 141, an inner surface shape of the tubular body 190 is measured with high accuracy by integrating measurement results in a plurality of measurement points obtained from the distance sensor.

Figure 4:
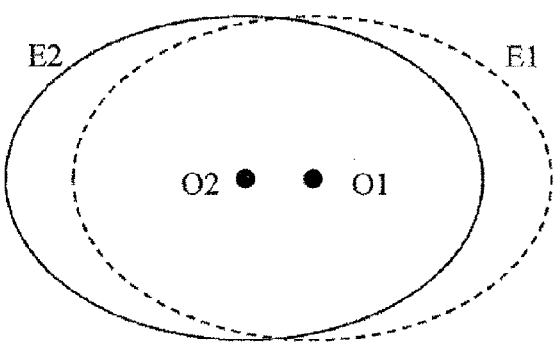
FIG. 4 is a schematic diagram in which measurement results are projected on a plane surface H3 according to the first embodiment.

When a central axis C1 of the tubular body 190 and a central axis C2 of the inner surface shape measuring device are tilted, also in the case in which the cross-sectional shape of the tubular body 190 has a complete round, an ellipsoid is obtained in the measurement result. At this time, in the case in which the measurement results are projected on a plane surface H3, a central point O1 of an ellipsoid E1 having the cross-sectional shape 160 and a central point O2 of an ellipsoid E2 having the cross-sectional shape 161 are present in different positions as illustrated in FIG. 4.

A distance L between an intersection point N1 of the cross-sectional shape 160 and the central axis C2 and an intersection point N2 of the cross-sectional shape 161 and the central axis C2 is a predetermined value. Therefore, from a distance ΔC between O1 and O2, a tilt of the central axis can be calculated by the following formula (1).

$$\theta = \arcsin(\Delta C/L) \quad (1)$$

A positional relationship between the cross-sectional shape 160 and the cross-sectional shape 161, a positional relationship between O1 and O2, and the tilt θ between the central axes are used to correct an equation (2) of the ellipsoid. Thereby, an inner surface shape of the tubular body in which an influence of the tilt of the central axis is reduced can be calculated. Therefore, tilts of the central axes of an inner diameter measuring device 300 and the tubular body 190 are not adjusted to measure the inner surface shape of the tubular body 190 with high accuracy, and an installation is facilitated.

$$Ax^2 + Bxy + Cy^2 + Dx + Ey + 1 = 0 \quad (2)$$

An example of a method for processing the tubular body, using the shape measuring device 100 of the tubular body inner surface according to the present embodiment will be described.

Figure 5:
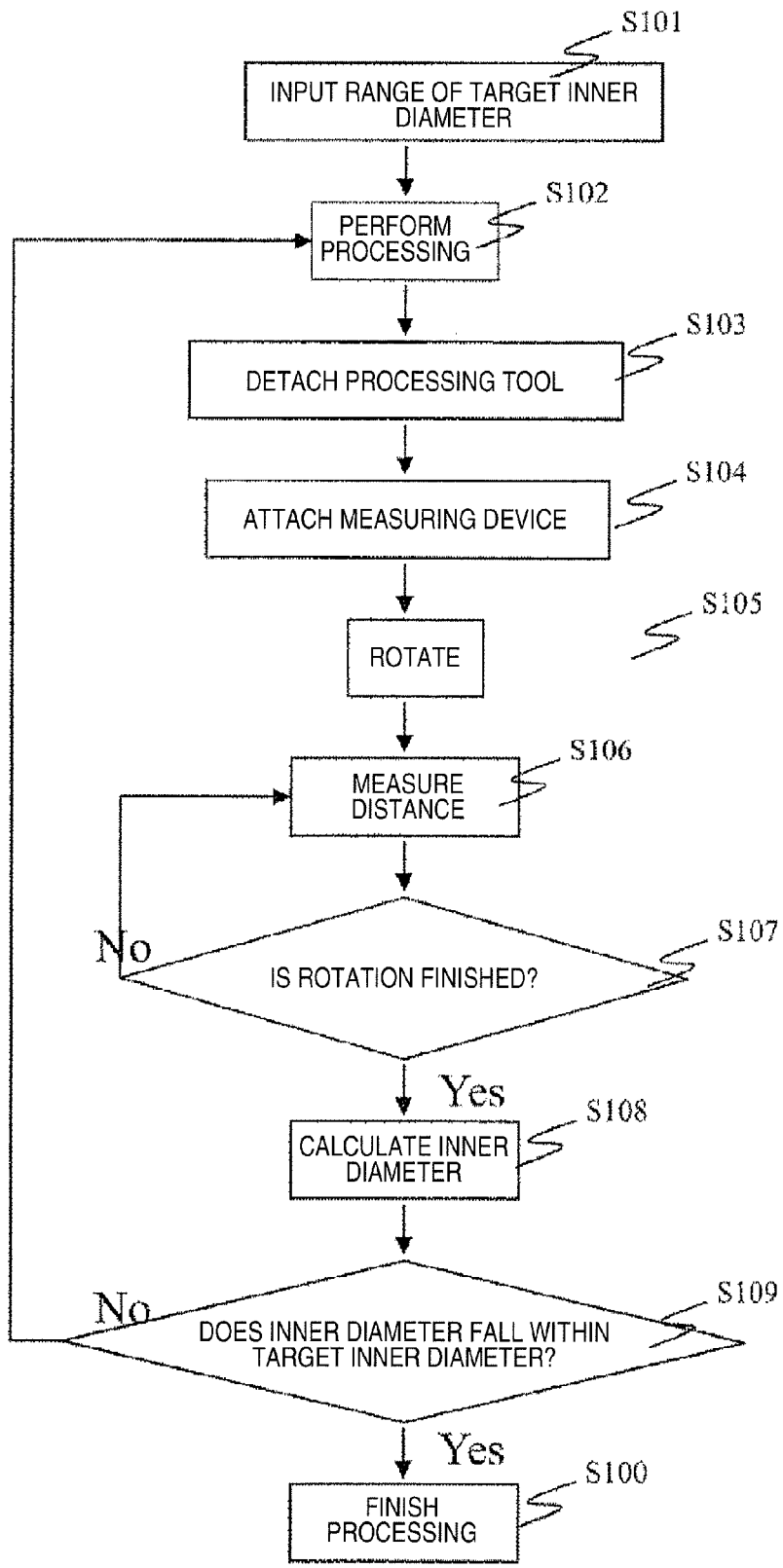
FIG. 5 is a processing flowchart using the shape measuring device 100 of the tubular body inner surface according to the first embodiment.

FIG. 5 is an example of a processing flowchart using the shape measuring device 100 of the tubular body inner surface.

A processing tool is attached to a processing machine. The tubular body 190 is fixed on a rotation base 126, a range of a target inner diameter is input (S101), processing is performed (S102), the processing tool is detached (S103), the measuring device 100 is attached (S104), the rotation stage 173 is rotated (S105), a distance is measured (S106), and whether or not the rotation of the rotation stage 173 is finished is determined (S107). In the case in which the rotation is not finished, a distance measurement is continued. In the case in which the rotation is finished, an inner diameter is calculated (S108) and whether or not the inner diameter falls within the target inner diameter is determined (S109). In the case in which the inner diameter does not fall within the target inner diameter, the shape measuring device 100 is detached and the processing tool is attached. In the case in which the inner diameter falls within the target inner diameter, the processing is finished (S110).

The tubular body 190 can be processed without detaching the tubular body 190 from the rotation base 126 of the processing machine.

Figure 8:
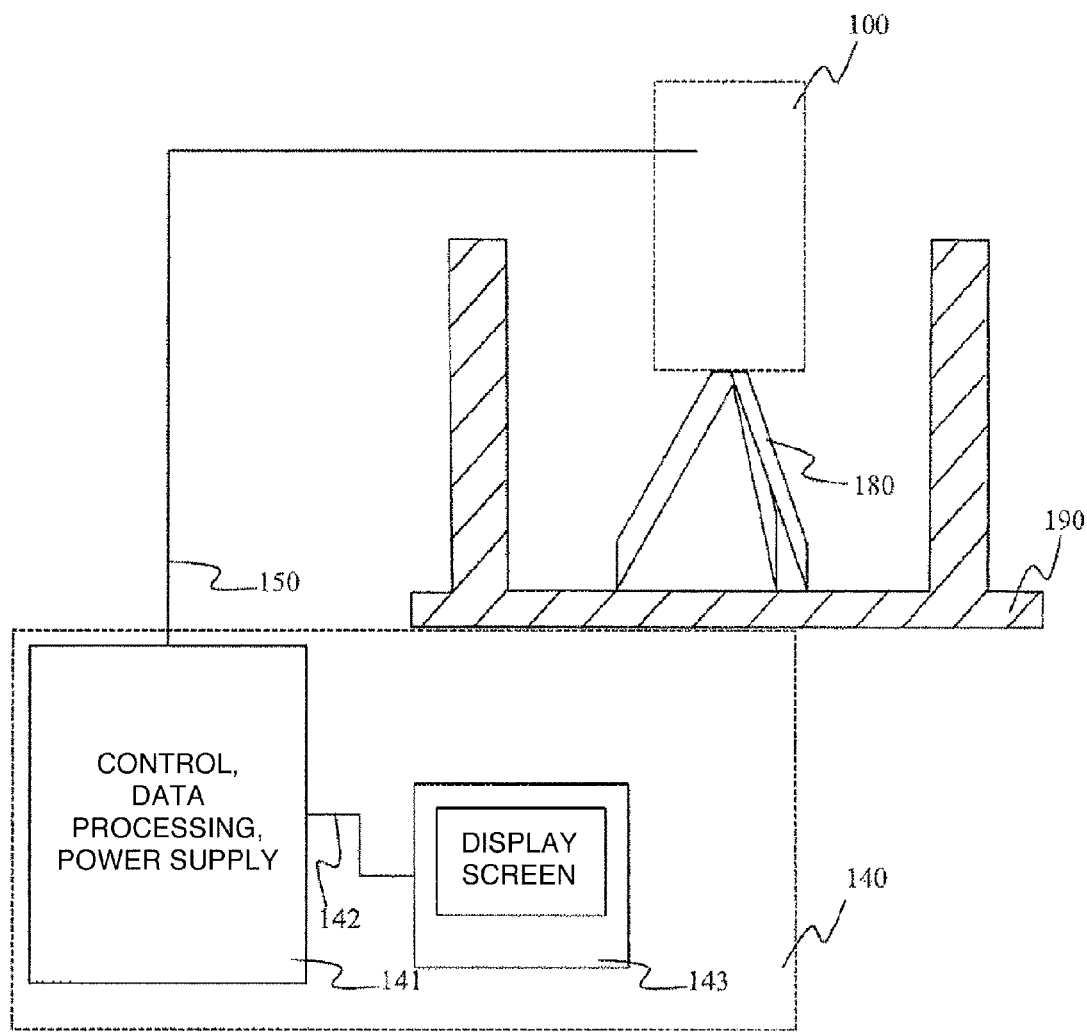
FIG. 8 is a block diagram in which the measuring device 100 is installed in a rotation base 126 according to the first embodiment.

In the present embodiment, the adapter 130 is used in order to mount the shape measuring device 100 on the processing machine. However, as illustrated in FIG. 8, the shape measuring device 100 may be installed on the tubular body 190 or the rotation base 126 using a tripod 180, and the shape of the tubular body inner surface may be measured.

Figure 6:
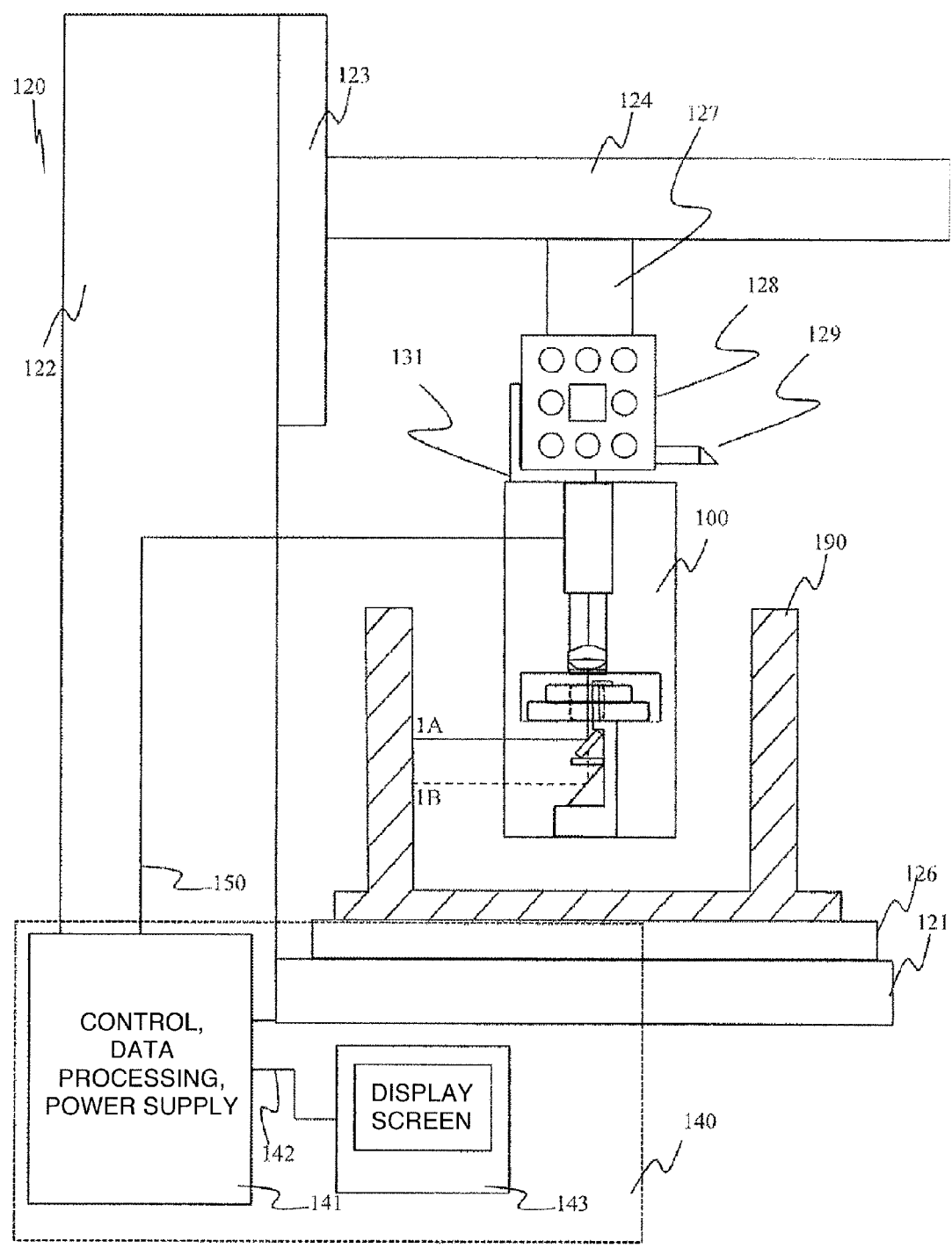
FIG. 6 is a processing flowchart in which a processing tool is not detached using the shape measuring device 100 of the tubular body inner surface according to the first embodiment.
Figure 7:
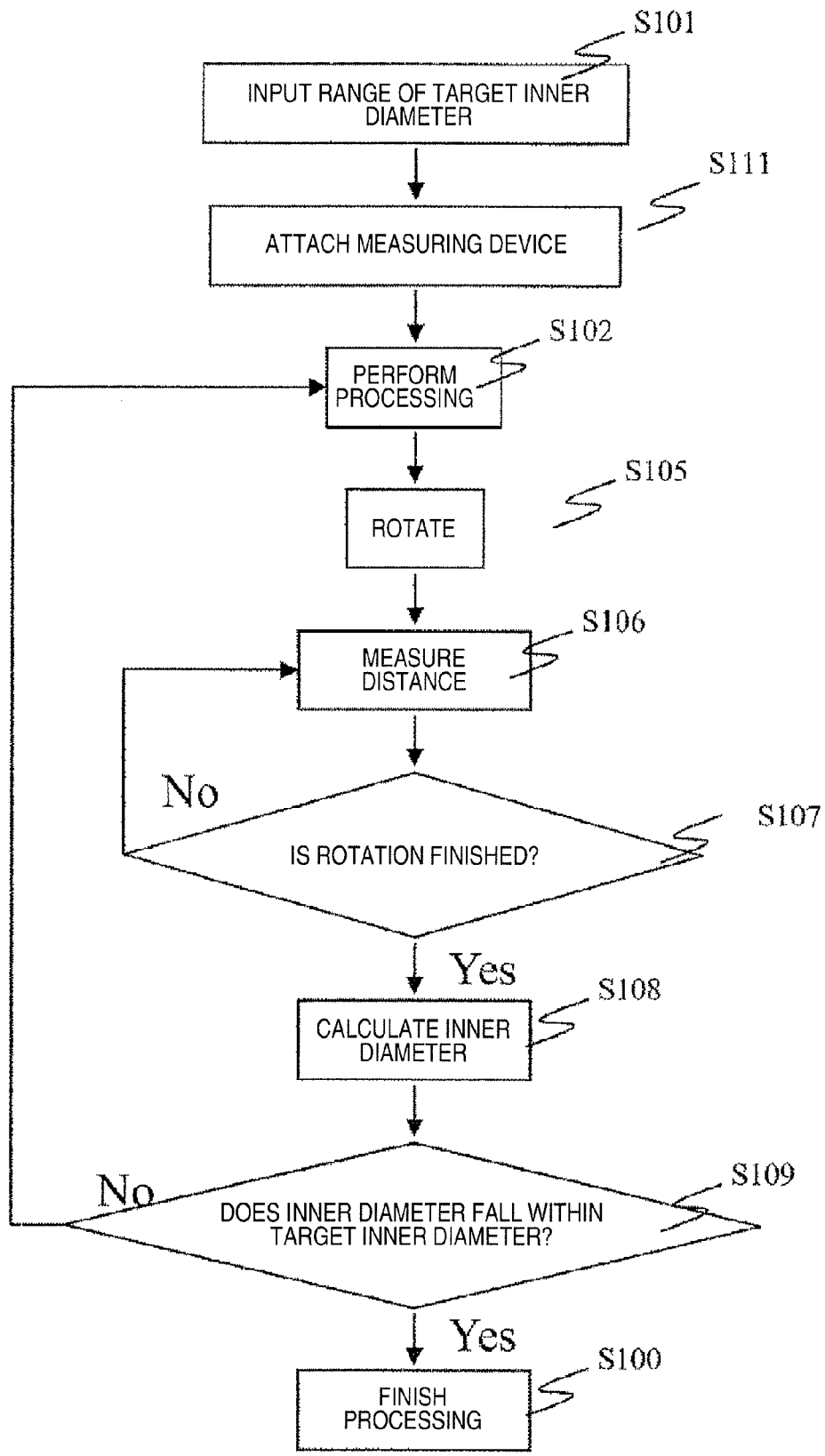
FIG. 7 is a processing flowchart in which the processing tool is not detached using the shape measuring device 100 of the tubular body inner surface according to the first embodiment.

In the present embodiment, as illustrated in the flowchart of FIG. 5, the processing tool is detached and the measuring device 100 is attached. Further, as illustrated in FIG. 6, a configuration may be used in which a processing tool 129 is attached to a bite holder 128, the processing tool 129 is not detached, but the measuring device 100 is attached using an adapter 131. An example of the processing flowchart is illustrated in FIG. 7 in which the processing tool 129 is not detached from the processing machine, but the measuring device 100 is attached, and the shape measuring device 100 of the tubular body inner surface is used. The processing tool 129 is attached to the processing machine. The tubular body 190 is fixed on the rotation base 126, the range of the target inner diameter is input (S101), the measuring device is attached (S111), the processing is performed (S102), the rotation stage 173 is rotated (S105), the distance is measured (S106), and whether or not the rotation of the rotation stage 173 is finished is determined (S107). In the case in which the rotation is not finished, the distance measurement is continued. In the case in which the rotation is finished, the inner diameter is calculated (S108) and whether or not the inner diameter falls within the target inner diameter is determined (S109). In the case in which the inner diameter does not fall within the target inner diameter, the processing is performed (S102). In the case in which the inner diameter falls within the target inner diameter, the processing is finished (S110). The processing can be performed without detaching the processing tool 129 from the processing machine, and the processing can be performed with high accuracy.

As a result, according to the present embodiment, light from the distance sensor 111 is separated in plurality in the light traveling direction by the half mirror 174 being the separation unit. Thereby, since a tilt of the central axis can be measured and corrected, measurement accuracy can be improved without increasing a size of the device.

Second Embodiment

In a second embodiment, an example of a shape measuring device of a tubular body inner surface and a method in which shape measurement accuracy does not depend on rotation accuracy will be described. In the present embodiment, a separation unit that separates light from the distance sensor 111 is characterized in that optical fibers 211 to 213 are used.

Figure 9:
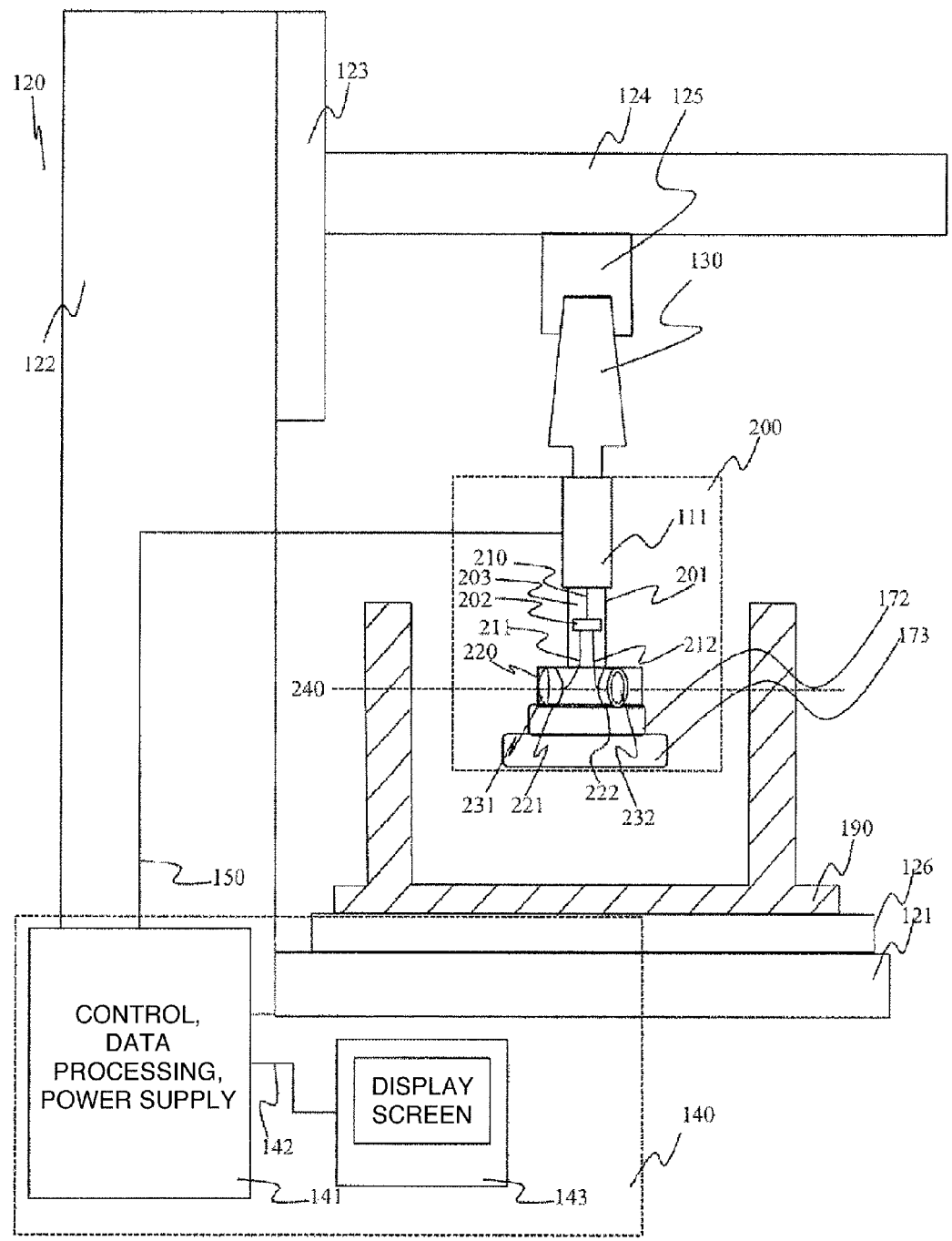
FIG. 9 is a block diagram illustrating a shape measuring device 200 according to a second embodiment.
Figure 10:
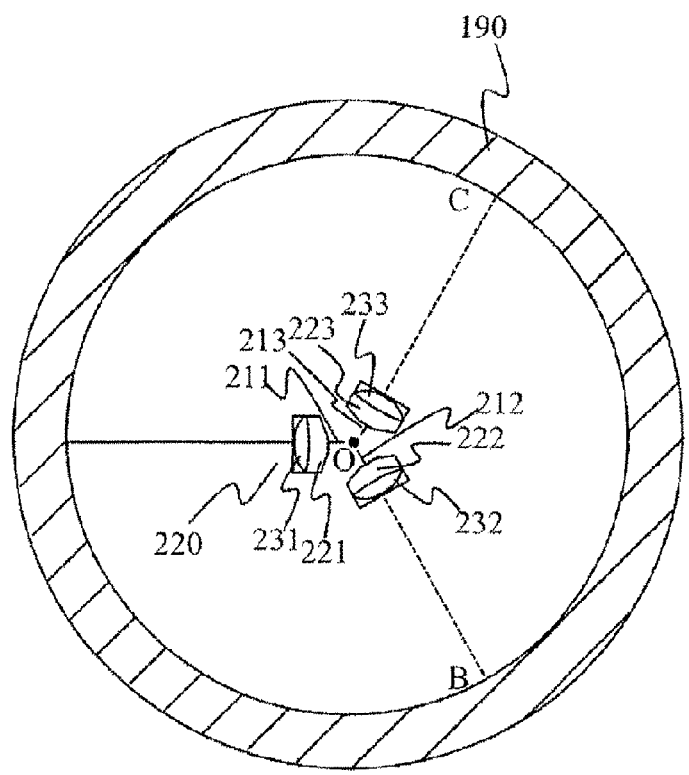
FIG. 10 illustrates a cross-sectional diagram in a plane surface 240 of FIG. 9.

FIG. 9 is an example of a block diagram illustrating the shape measuring device 200 according to the present embodiment. FIG. 10 illustrates a cross-sectional diagram in a plane surface 240 of FIG. 9. About portions having the same functions as those of elements to which the same reference numerals illustrated in FIGS. 1 to 8 previously described are given, descriptions will be saved.

An output from the distance sensor 111 is guided to an optical fiber 210 connected to an optical switch 202. Through a relay cable 150, the circuit unit 141 determines the optical switch 202 is connected to any of the optical fibers 211 to 213. An output from the distance sensor 111 that passes through the optical fibers 211 to 213 is irradiated on the measuring object 190 using collimator lenses 231 to 233, respectively. By detecting light that passes through the same path in the opposite direction from an irradiated point and returns up to the distance sensor, the distance sensor 111 measures a distance up to the measuring object. Collimator lens mounters 221 to 223 on which the collimator lenses 231 to 233 are mounted are arranged in different directions in the same plane, respectively. As a result, light from the distance sensor can be separated in plurality in directions different from the light traveling direction by the optical fibers 211 to 213 being the separation unit.

The center of the collimator lens mounters 221 to 223 is set to O, and points in which light that passes through the collimator lenses 231 to 233 impinges on the measuring object 190 are set to A, B, and C, respectively. From optical distances of the optical fibers 210 to 213, an optical distance within the optical switch 202, a positional relationship between the collimator lenses 231 to 233, and measurement results of the distance sensor 111, a distance between the point O and each of the points A to C can be calculated.

Figure 11:
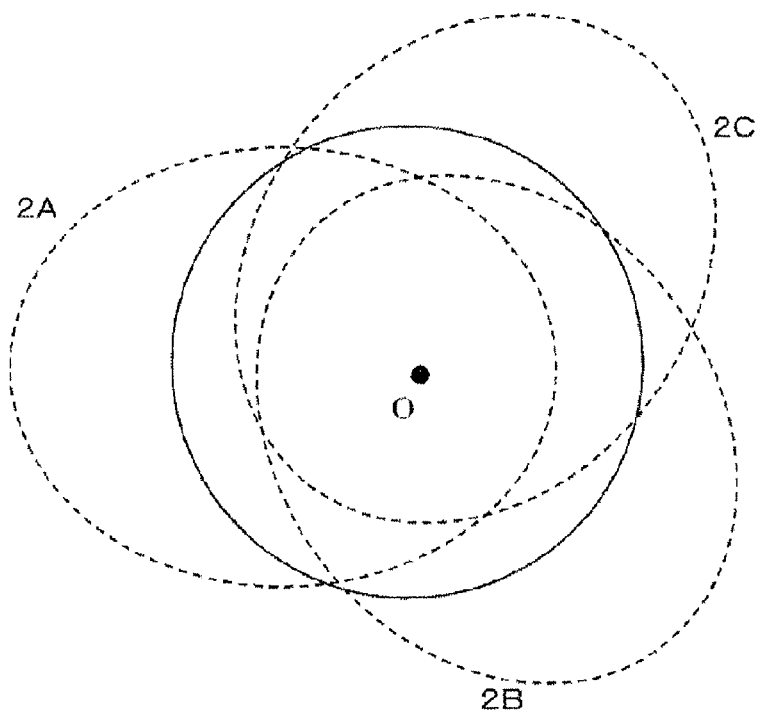
FIG. 11 is a schematic diagram of measurement results in the case in which axis wobbling occurs according to the second embodiment.

From control signals of the optical switch 202, distance measurement results of the distance sensor 111, and an angle of the rotation stage 173, the circuit unit 141 being the data processing unit obtains inner surface shapes 2A to 2C of the measuring object, respectively. Also when inner surface shapes of the measuring object has a complete round, in the case in which axis wobbling occurs in the rotation stage 173, ellipsoids are obtained in measurement results of 2A to 2C as illustrated in FIG. 11. The measurement results of 2A to 2C are integrated, and thereby the measurement results from which an influence of the axis wobbling is excluded can be obtained. When an arrangement is performed so that ∠AOC=∠COB=∠BOA=120° holds, an average value of 2A, 2B, and 2C is taken in a coordination system around the point O as its center to thereby exclude the influence of the axis wobbling, and the calculation is facilitated.

In the present embodiment, the rotation stage 173 is rotated; further, even if the measuring object 190 is rotated and measured, for example, using a processing machine rotation base 126, a measurement from which an influence of the rotation wobbling is excluded is possible similarly.

As a result, according to the present embodiment, light from the distance sensor 111 is separated in plurality in directions different from the light traveling direction by the optical fibers 211 to 213 being the separation unit. Thereby, since the measurement from which an influence of the axis wobbling is excluded can be performed, measurement accuracy can be improved without increasing a size of the device.

Third Embodiment

In a third embodiment, an example of a shape measuring device and a method in which both of tubular body inner surface and outer surface are measured using the shape measuring device according to the second embodiment will be described.

Figure 12:
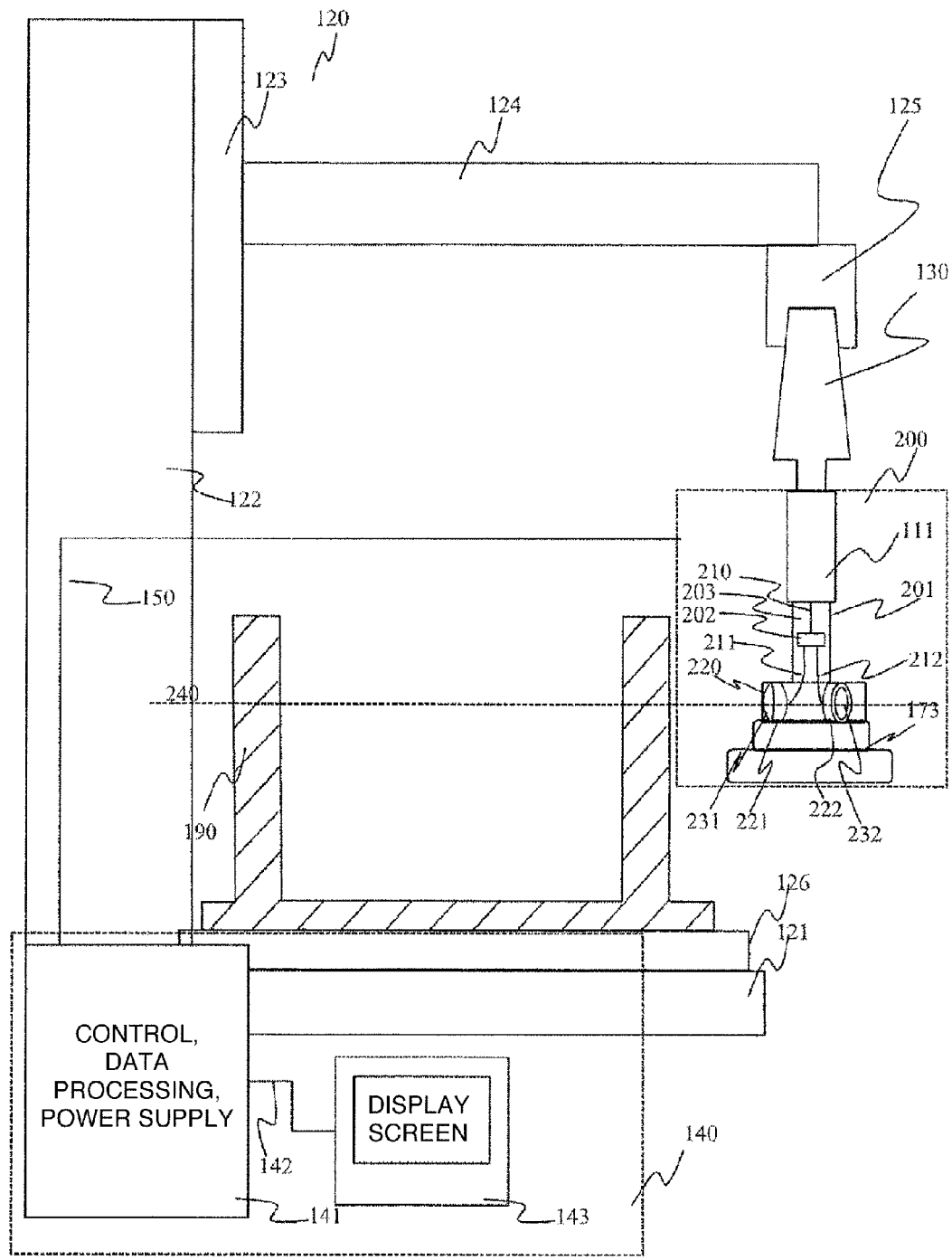
FIG. 12 is an example of a shape measuring method in a tubular body outer surface according to a third embodiment.
Figure 13:
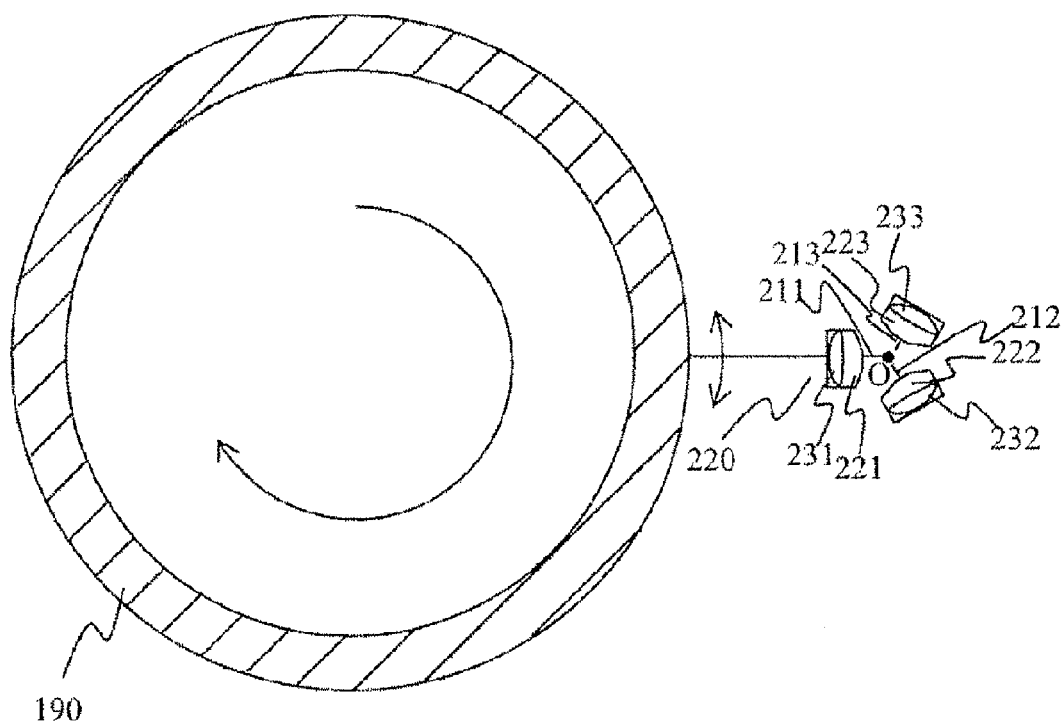
FIG. 13 is an example of a cross-sectional diagram in the plane surface 240 of FIG. 12.
Figure 14:
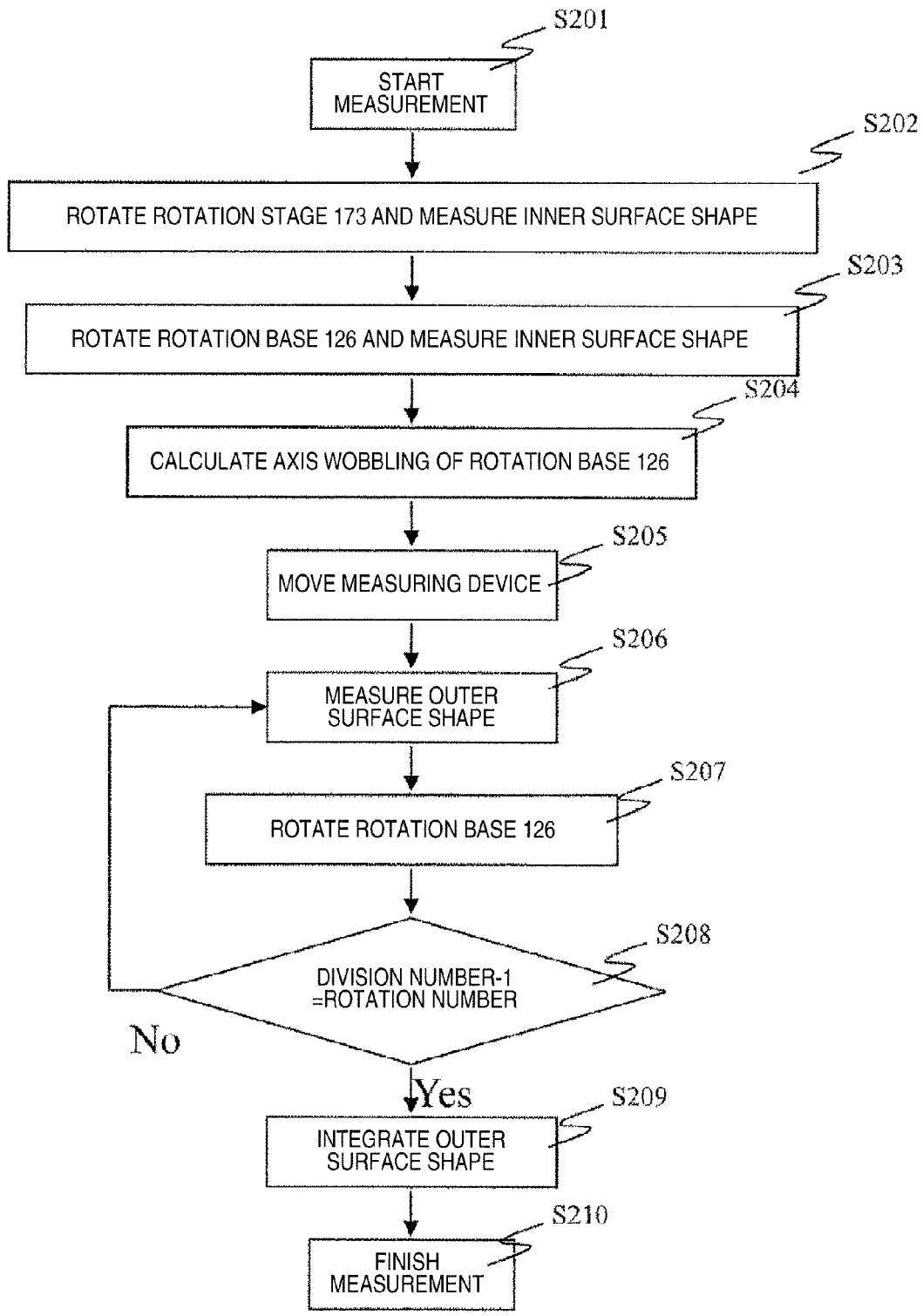
FIG. 14 is an example of a measurement flowchart of the shape measuring method in the tubular body outer surface according to the third embodiment.

In FIG. 12, the shape measuring device of the tubular body outer surface according to the present embodiment is illustrated. In FIG. 13, an example of a cross-sectional diagram in the plane surface 240 of FIG. 12 is illustrated. In FIG. 14, a measurement flowchart of the shape measuring method of the tubular body outer surface according to the present embodiment is illustrated.

The shape measurement according to the present embodiment will be described using FIGS. 12, 13, and 14. In the present embodiment, the rotation stage 173 is rotated to measure an inner surface shape of the measuring object 190 (S202). Next, the measuring object 190 is rotated, for example, using the processing machine rotation base 126 to measure an inner surface shape (S203). From measurement results of the inner surface shape measured by a procedure of S202 and S203, the axis wobbling of the processing machine rotation base 126 is calculated (S204). At this time, in the case in which rotation accuracy of the rotation stage 173 is previously known, results in which the measurement is performed using any one of the inner surface shapes 2A to 2C may be used.

The measuring device 200 is moved to the outside of the tubular body (S205), and the rotation stage 173 is rotated to measure an outer surface shape of the measuring object 190 (S206). The outer surface capable of being measured as illustrated in FIG. 13 is a part thereof, and therefore the rotation base 126 is rotated to divide and measure an outer circumference. The rotation base 126 is rotated (S207), and outer surface shapes are combined to measure the whole shape of the outer surface using results of the axis wobbling of the rotation base 126 calculated at S204 (S210).

According to the present embodiment, in addition to the tubular body inner surface, the tubular body outer surface also can be measured with high measurement accuracy without increasing a size of the device. In the present embodiment, the shape measuring device according to the second embodiment is used; further, the shape measuring device according to the first embodiment may be used.

Fourth Embodiment

A fourth embodiment being a modification of the third embodiment will be described. In the present embodiment, an example of a shape measuring device and a method of a tubular body outer surface will be described.

Figure 15:
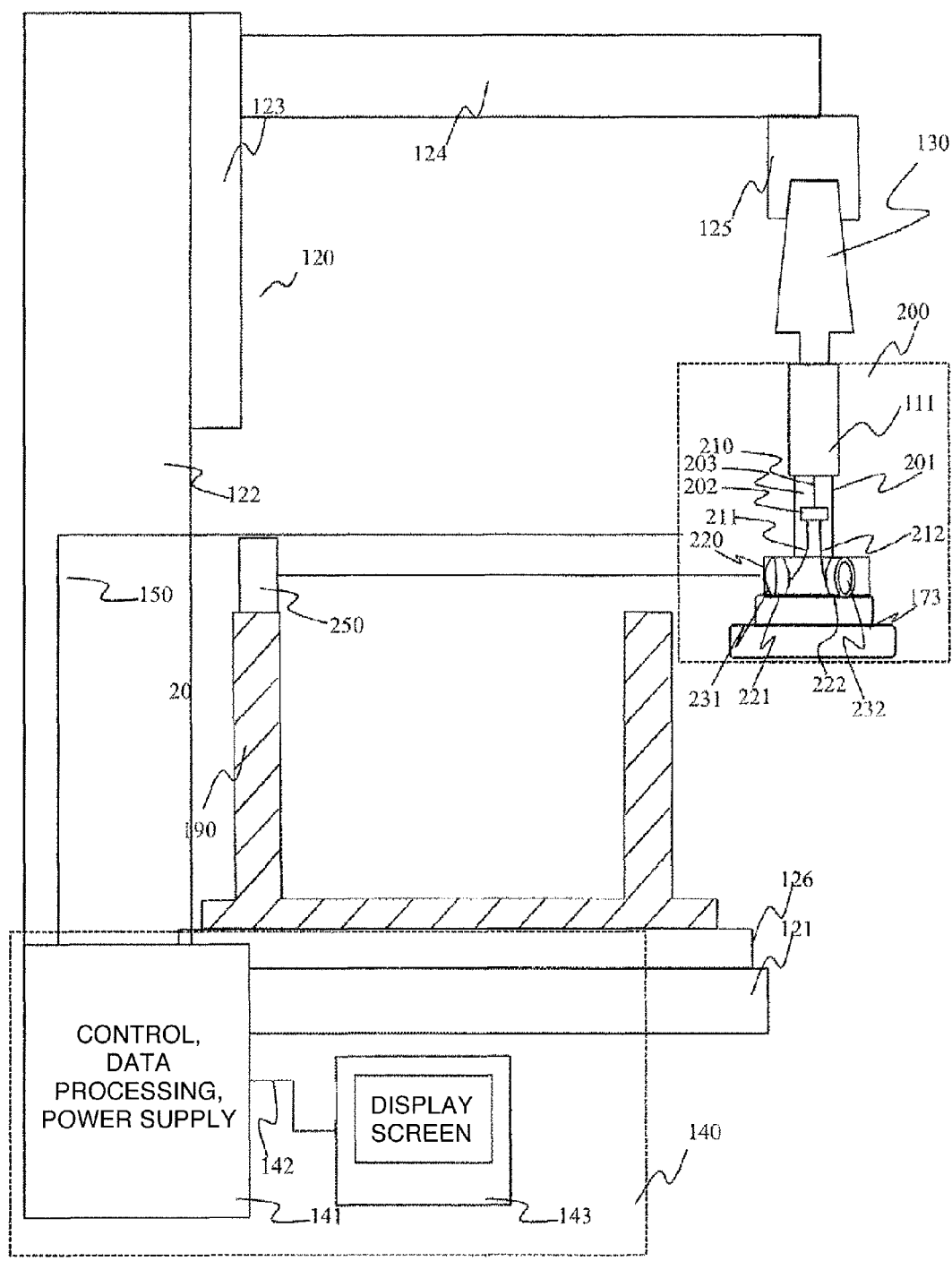
FIG. 15 is an example of the shape measuring method in the tubular body outer surface according to a fourth embodiment.
Figure 16:
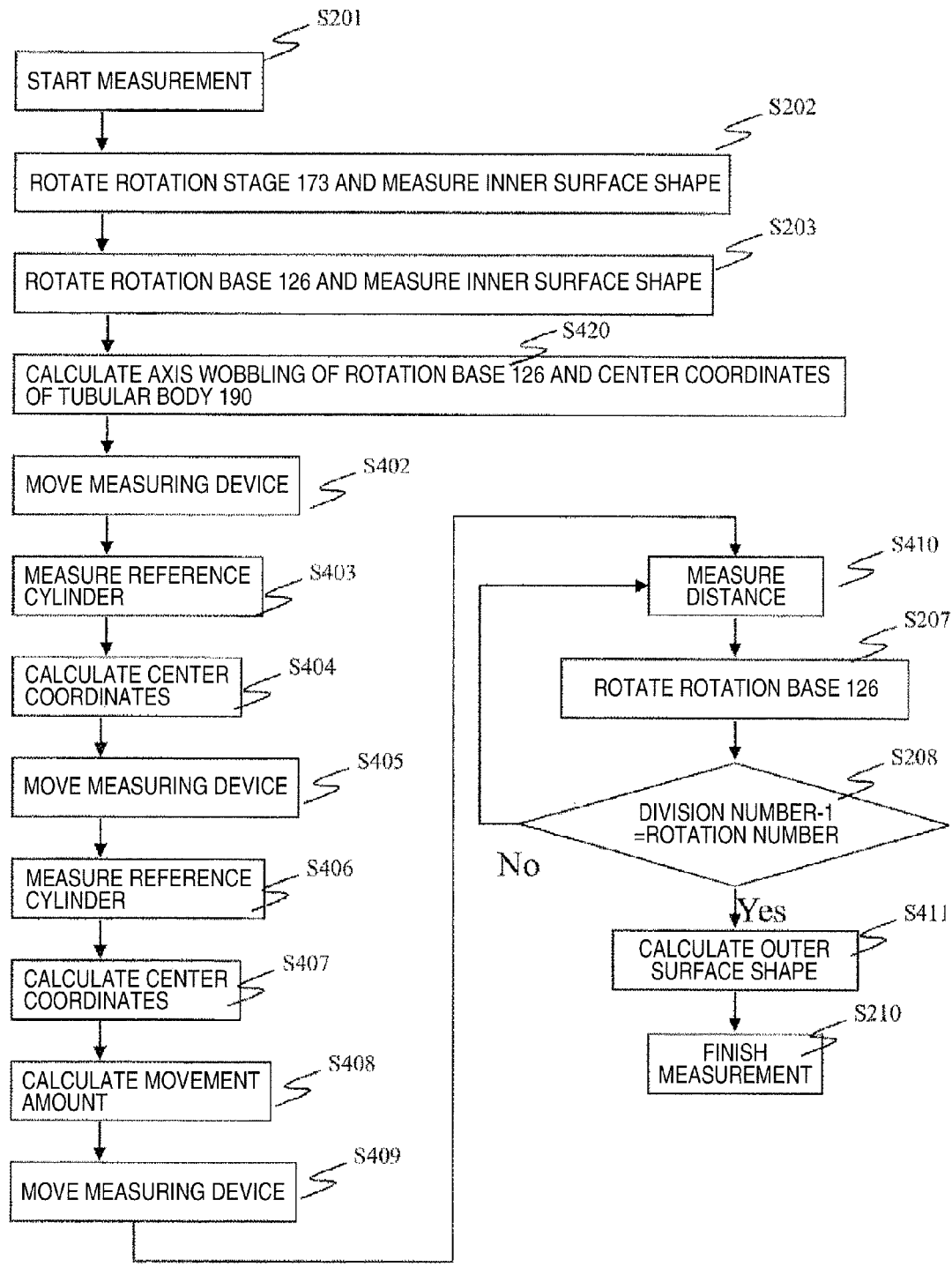
FIG. 16 is an example of a shape measurement flowchart of the tubular body outer surface according to the fourth embodiment.

In FIG. 15, the shape measuring device of the tubular body outer surface according to the present embodiment is illustrated. In FIG. 16, a shape measurement flowchart of the tubular body outer surface according to the present embodiment is illustrated. The present embodiment is characterized in that by measuring a shape of a reference cylinder 250 the shape of which is known, the movement amount at the time of moving from the inside of the tubular body to the outside thereof is calculated and the outer diameter of the tubular body is calculated from the movement amount and center coordinates of the tubular body.

The shape measurement according to the present embodiment will be described using FIGS. 15 and 16. In the present embodiment, the rotation stage 173 is rotated to measure an inner surface shape of the measuring object 190 (S202). Next, the measuring object 190 is rotated, for example, using the processing machine rotation base 126 to measure an inner surface shape (S203). From measurement results of the inner surface shape measured by a procedure of S202 and S203, the axis wobbling of the processing machine rotation base 126 and the center coordinates of the tubular body 190 are calculated (S420). The measuring device 200 is moved upward by a feed mechanism 123 (S402), a shape of the reference cylinder 250 is measured (S403), the center coordinates of the reference cylinder 250 are calculated (S404), the measuring device 200 is moved to the outside of the tubular body 126 by a feed mechanism 124 (S405), the shape of the reference cylinder 250 is measured again (S406), the center coordinates of the reference cylinder 250 are calculated (S407), the movement amount at S405 is calculated from measurement results at S404 and S407 (S408), the measuring device 200 is moved downward by the feed mechanism 123 (S409), laser is irradiated on an outer surface of the tubular body 190 to measure a distance (S410), the rotation base 126 is rotated (S207), distance measurement results are integrated using results of the axis wobbling of the rotation base 126 calculated at S420, and the outer surface shape of the tubular body is calculated from the movement amount calculated at S408 and the center coordinates of the tubular body 190 calculated at S420 (S411).

According to the present embodiment, the movement amount is calculated using the reference cylinder 250 (S408). Therefore, at the time of measuring the outer surface, the rotation stage 173 is not rotated, the outer circumference is not required to be divided and measured, the outer surface shape can be calculated, and the procedure is facilitated.

In addition, the present invention is not limited to the above-described embodiments, but includes various modifications. For example, the above-described embodiments are described in detail in order to clearly describe the present invention, and are not necessarily limited to the device having all the described constructions. Further, a part of constructions according to one embodiment can be replaced by those according to other embodiment, and the constructions according to other embodiment can be added to that according to one embodiment. Further, an addition, deletion, or replacement of the constructions according to other embodiment can be performed by using a part of the constructions according to each embodiment.

REFERENCE SIGNS LIST

100 Shape measuring device according to the first embodiment
111 Distance sensor
120 Processing machine
140 Control unit
190 Tubular body
200 Shape measuring device according to the second embodiment

The invention claimed is:

1. A shape measuring device comprising:
a distance sensor that irradiates a laser beam on a measuring object and detects reflected light to calculate a distance up to a measurement point;
a separation unit that separates a light beam from the distance sensor in plurality of light beams;
a rotation unit that relatively rotates the distance sensor and the measuring object; and
a data processing unit that integrates measurement results of distances up to a plurality of measurement points obtained from the distance sensor and that corrects one or more of: (i) a tilt of a central axis toward the measuring object of the distance sensor and (ii) axis wobbling due to a rotation of the rotation unit.

2. The shape measuring device according to claim 1, wherein the separation unit separates a light beam from the distance sensor in plurality in a light traveling direction.

3. The shape measuring device according to claim 1, wherein the separation unit separates a light beam from the distance sensor in plurality in directions different from the light traveling direction.

4. The shape measuring device according to claim 1, wherein a processing machine that processes the measuring object is provided.

5. The shape measuring device according to claim 1, further comprising a movement mechanism that moves the distance sensor, wherein the data processing unit calculates a movement amount of the distance sensor.

6. A shape measuring method comprising the steps of:
separating a laser beam irradiated from a distance sensor into a plurality of light beams;
irradiating the separated light beams on a plurality of measurement points of a measuring object;
rotating the distance sensor relatively toward the measuring object;
detecting reflected light from the plurality of measurement points by the distance sensor to calculate distances up to the plurality of measurement points;
integrating measurement results of the distances up to the plurality of measurement points; and
correcting one or more of: (i) a tilt toward the measuring object in a traveling direction of the laser beam and (ii) axis wobbling of a rotation toward the measuring object of the distance sensor.

7. The shape measuring method according to claim 6, wherein the laser beam is separated into a plurality of light beams in a light traveling direction.

8. The shape measuring method according to claim 6, wherein the laser beam is separated into a plurality of light beams in directions different from the light traveling direction.

9. The shape measuring method according to claim 6, wherein the tilt toward the measuring object in the traveling direction of the laser beam is corrected using a result of integrating the measurement results of the distances up to the plurality of measurement points.

10. The shape measuring method according to claim 6, wherein the distance sensor is relatively moved toward the measuring object and a movement amount is calculated.

11. The shape measuring method according to claim 10, wherein the distance sensor is moved to an outer portion and an inner portion of the measuring object and shapes of the outer portion and the inner portion of the measuring object are measured.

12. The shape measuring method according to claim 11, wherein a distance up to a reference object a shape of which is known is detected by the distance sensor and is integrated with measurement results of distances up to the measuring object.

13. A processing method comprising a step of: processing the measuring object until measurement results according to the shape measuring method of claim 6 fall within a target.

* * * * *